(12) United States Patent
Iwakiri

(10) Patent No.: US 11,290,690 B2
(45) Date of Patent: Mar. 29, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yoshiki Iwakiri, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/798,190

(22) Filed: Feb. 21, 2020

(65) Prior Publication Data

US 2020/0288087 A1    Sep. 10, 2020

(30) Foreign Application Priority Data

Mar. 5, 2019    (JP) .............................. JP2019-039845

(51) Int. Cl.
*H04N 7/00* (2011.01)
*H04N 7/18* (2006.01)
*H04N 5/232* (2006.01)
*H04L 43/08* (2022.01)

(52) U.S. Cl.
CPC ............. *H04N 7/181* (2013.01); *H04L 43/08* (2013.01); *H04N 5/232* (2013.01)

(58) Field of Classification Search
CPC    H04N 7/00; H04N 5/00; H04N 13/00; H04N 21/00; H04L 43/00
See application file for complete search history.

(56) References Cited

U.S. PATENT DOCUMENTS

| 2010/0073483 | A1* | 3/2010 | Squillante | H04N 7/181 348/159 |
| 2012/0239820 | A1* | 9/2012 | Dziezanowski | H04L 41/0233 709/230 |
| 2014/0040966 | A1* | 2/2014 | Chen | H04N 21/64322 725/111 |
| 2014/0341484 | A1* | 11/2014 | Sebring | G06T 7/70 382/284 |
| 2017/0311037 | A1* | 10/2017 | Ohmura | H04N 5/232945 |
| 2018/0352215 | A1* | 12/2018 | Iwakiri | H04N 13/296 |

FOREIGN PATENT DOCUMENTS

| JP | 2003-319375 A | 11/2003 |
| JP | 2013-207475 A | 10/2013 |
| JP | 2017-211828 A | 11/2017 |

* cited by examiner

*Primary Examiner* — Maryam A Nasri
(74) *Attorney, Agent, or Firm* — Canon U.S.A., Inc. IP Division

(57) ABSTRACT

An exemplary embodiment of the present disclosure is directed to more appropriately transmitting image data output from image capturing units connected in a daisy chain connection. State information indicating a state of each of a plurality of image capturing units that are connected in a daisy chain connection and acquire image data to be transmitted to an image generation apparatus, which generates a virtual viewpoint image, in accordance with the daisy chain connection is acquired. An output destination of the image data for at least one image capturing unit included in the plurality of image capturing units is changed based on the acquired state information.

15 Claims, 13 Drawing Sheets

FIG.4

| IMAGE PROCESSING APPARATUS # | CONNECTED CAMERA # | CONNECTED APPARATUS | OUTPUT DESTINATION APPARATUS |
|---|---|---|---|
| IMAGE PROCESSING APPARATUS 200 | CAMERA 100 | AGGREGATION SERVER APPARATUS 500<br>IMAGE PROCESSING APPARATUS 201 | AGGREGATION SERVER APPARATUS 500 |
| IMAGE PROCESSING APPARATUS 201 | CAMERA 101 | IMAGE PROCESSING APPARATUS 200<br>IMAGE PROCESSING APPARATUS 202 | IMAGE PROCESSING APPARATUS 200 |
| IMAGE PROCESSING APPARATUS 202 | CAMERA 102 | IMAGE PROCESSING APPARATUS 201<br>IMAGE PROCESSING APPARATUS 203 | IMAGE PROCESSING APPARATUS 201 |
| IMAGE PROCESSING APPARATUS 203 | CAMERA 103 | IMAGE PROCESSING APPARATUS 202<br>IMAGE PROCESSING APPARATUS 204 | IMAGE PROCESSING APPARATUS 202 |
| IMAGE PROCESSING APPARATUS 204 | CAMERA 104 | IMAGE PROCESSING APPARATUS 203<br>IMAGE PROCESSING APPARATUS 205 | IMAGE PROCESSING APPARATUS 203 |
| IMAGE PROCESSING APPARATUS 205 | CAMERA 105 | IMAGE PROCESSING APPARATUS 204<br>IMAGE PROCESSING APPARATUS 206 | IMAGE PROCESSING APPARATUS 204 |
| IMAGE PROCESSING APPARATUS 206 | CAMERA 106 | IMAGE PROCESSING APPARATUS 205<br>IMAGE PROCESSING APPARATUS 207 | IMAGE PROCESSING APPARATUS 207 |
| IMAGE PROCESSING APPARATUS 207 | CAMERA 107 | IMAGE PROCESSING APPARATUS 206<br>IMAGE PROCESSING APPARATUS 208 | IMAGE PROCESSING APPARATUS 208 |
| IMAGE PROCESSING APPARATUS 208 | CAMERA 108 | IMAGE PROCESSING APPARATUS 207<br>IMAGE PROCESSING APPARATUS 209 | IMAGE PROCESSING APPARATUS 209 |
| IMAGE PROCESSING APPARATUS 209 | CAMERA 109 | IMAGE PROCESSING APPARATUS 208<br>IMAGE PROCESSING APPARATUS 210 | IMAGE PROCESSING APPARATUS 210 |
| IMAGE PROCESSING APPARATUS 210 | CAMERA 110 | IMAGE PROCESSING APPARATUS 209<br>IMAGE PROCESSING APPARATUS 211 | IMAGE PROCESSING APPARATUS 211 |
| IMAGE PROCESSING APPARATUS 211 | CAMERA 111 | IMAGE PROCESSING APPARATUS 210<br>AGGREGATION SERVER APPARATUS 500 | AGGREGATION SERVER APPARATUS 500 |

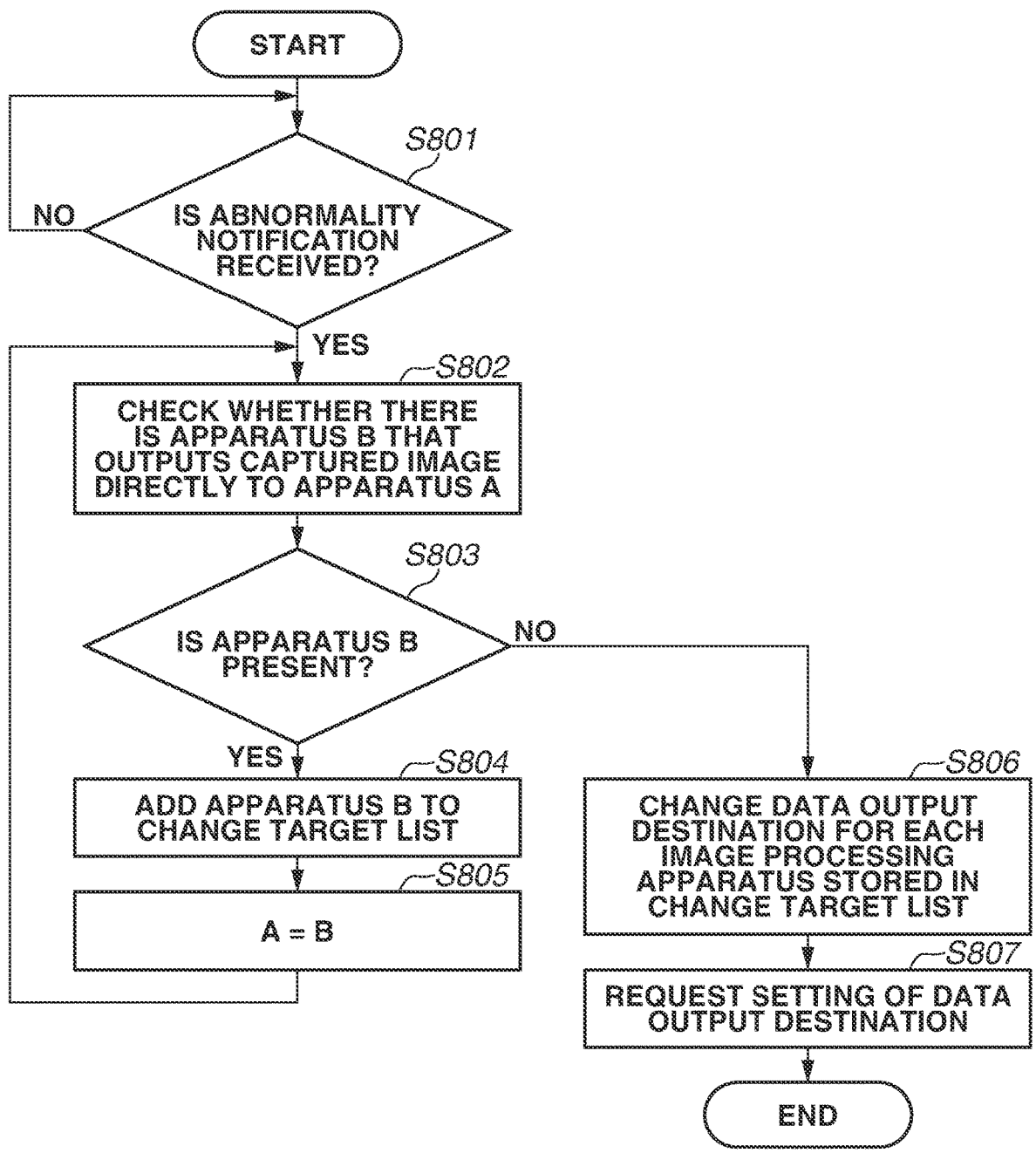

FIG.7

| IMAGE PROCESSING APPARATUS # | CONNECTED CAMERA # | CONNECTED APPARATUS | OUTPUT DESTINATION APPARATUS |
|---|---|---|---|
| IMAGE PROCESSING APPARATUS 200 | CAMERA 100 | AGGREGATION SERVER APPARATUS 500<br>IMAGE PROCESSING APPARATUS 201 | AGGREGATION SERVER APPARATUS 500 |
| IMAGE PROCESSING APPARATUS 201 | CAMERA 101 | IMAGE PROCESSING APPARATUS 200<br>IMAGE PROCESSING APPARATUS 202 | IMAGE PROCESSING APPARATUS 200 |
| IMAGE PROCESSING APPARATUS 202 | CAMERA 102 | IMAGE PROCESSING APPARATUS 201<br>IMAGE PROCESSING APPARATUS 203 | IMAGE PROCESSING APPARATUS 201 |
| IMAGE PROCESSING APPARATUS 203 | CAMERA 103 | IMAGE PROCESSING APPARATUS 202<br>IMAGE PROCESSING APPARATUS 204 | IMAGE PROCESSING APPARATUS 202 |
| IMAGE PROCESSING APPARATUS 204 | CAMERA 104 | IMAGE PROCESSING APPARATUS 203<br>IMAGE PROCESSING APPARATUS 205 | IMAGE PROCESSING APPARATUS 205 |
| IMAGE PROCESSING APPARATUS 205 | CAMERA 105 | IMAGE PROCESSING APPARATUS 204<br>IMAGE PROCESSING APPARATUS 206 | IMAGE PROCESSING APPARATUS 206 |
| IMAGE PROCESSING APPARATUS 206 | CAMERA 106 | IMAGE PROCESSING APPARATUS 205<br>IMAGE PROCESSING APPARATUS 207 | IMAGE PROCESSING APPARATUS 207 |
| IMAGE PROCESSING APPARATUS 207 | CAMERA 107 | IMAGE PROCESSING APPARATUS 206<br>IMAGE PROCESSING APPARATUS 208 | IMAGE PROCESSING APPARATUS 208 |
| IMAGE PROCESSING APPARATUS 208 | CAMERA 108 | IMAGE PROCESSING APPARATUS 207<br>IMAGE PROCESSING APPARATUS 209 | IMAGE PROCESSING APPARATUS 209 |
| IMAGE PROCESSING APPARATUS 209 | CAMERA 109 | IMAGE PROCESSING APPARATUS 208<br>IMAGE PROCESSING APPARATUS 210 | IMAGE PROCESSING APPARATUS 210 |
| IMAGE PROCESSING APPARATUS 210 | CAMERA 110 | IMAGE PROCESSING APPARATUS 209<br>IMAGE PROCESSING APPARATUS 211 | IMAGE PROCESSING APPARATUS 211 |
| IMAGE PROCESSING APPARATUS 211 | CAMERA 111 | IMAGE PROCESSING APPARATUS 210<br>AGGREGATION SERVER APPARATUS 500 | AGGREGATION SERVER APPARATUS 500 |

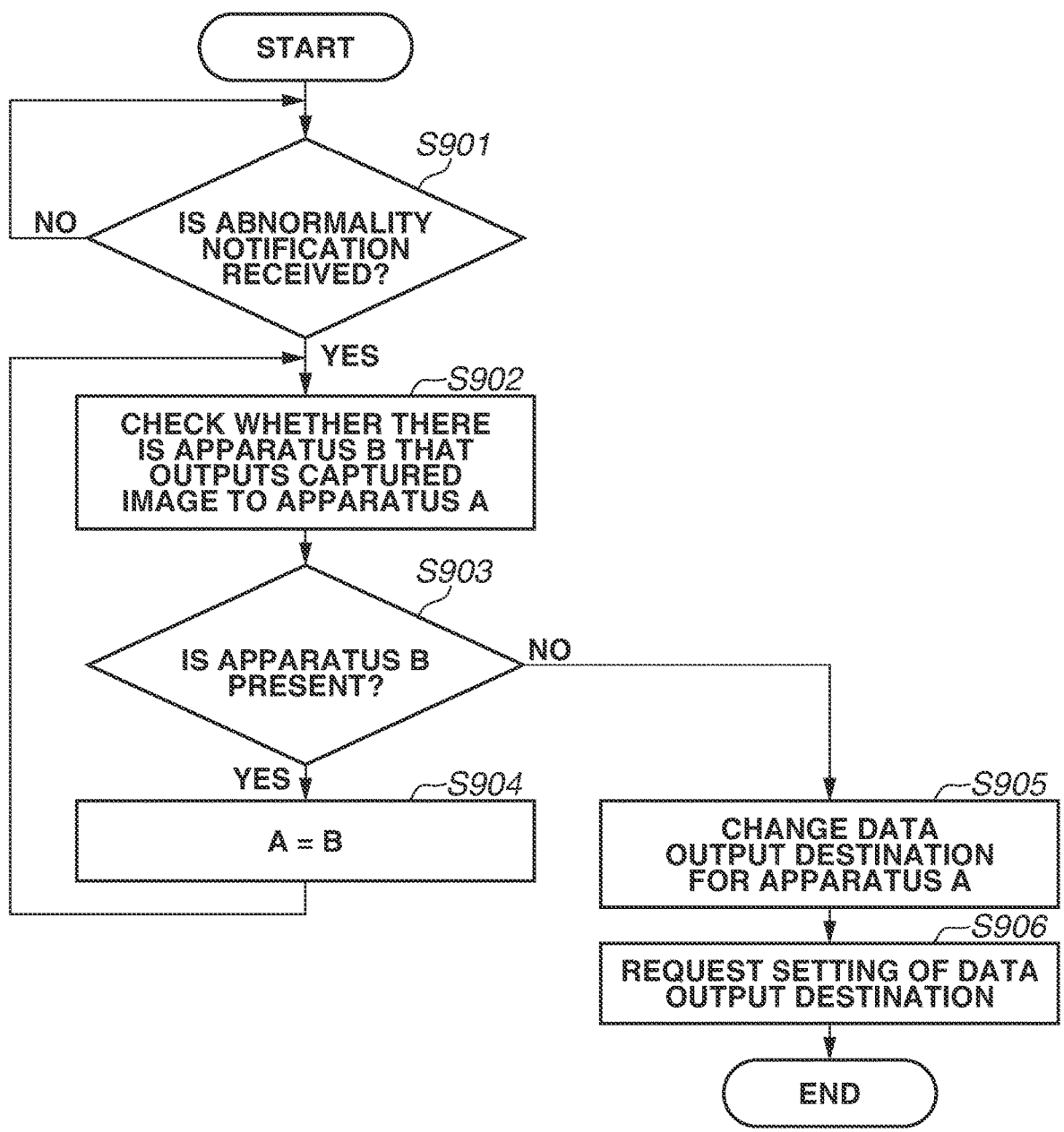

FIG.10

| IMAGE PROCESSING APPARATUS # | CONNECTED CAMERA # | CONNECTED APPARATUS | OUTPUT DESTINATION APPARATUS |
|---|---|---|---|
| IMAGE PROCESSING APPARATUS 200 | CAMERA 100 | AGGREGATION SERVER APPARATUS 500<br>IMAGE PROCESSING APPARATUS 201 | AGGREGATION SERVER APPARATUS 500 |
| IMAGE PROCESSING APPARATUS 201 | CAMERA 101 | IMAGE PROCESSING APPARATUS 200<br>IMAGE PROCESSING APPARATUS 202 | IMAGE PROCESSING APPARATUS 200 |
| IMAGE PROCESSING APPARATUS 202 | CAMERA 102 | IMAGE PROCESSING APPARATUS 201<br>IMAGE PROCESSING APPARATUS 203 | IMAGE PROCESSING APPARATUS 201 |
| IMAGE PROCESSING APPARATUS 203 | CAMERA 103 | IMAGE PROCESSING APPARATUS 202<br>IMAGE PROCESSING APPARATUS 204 | IMAGE PROCESSING APPARATUS 202 |
| IMAGE PROCESSING APPARATUS 204 | CAMERA 104 | IMAGE PROCESSING APPARATUS 203<br>IMAGE PROCESSING APPARATUS 205 | IMAGE PROCESSING APPARATUS 203 |
| IMAGE PROCESSING APPARATUS 205 | CAMERA 105 | IMAGE PROCESSING APPARATUS 204<br>IMAGE PROCESSING APPARATUS 206 | IMAGE PROCESSING APPARATUS 204 |
| IMAGE PROCESSING APPARATUS 206 | CAMERA 106 | IMAGE PROCESSING APPARATUS 205<br>IMAGE PROCESSING APPARATUS 207 | IMAGE PROCESSING APPARATUS 205 |
| IMAGE PROCESSING APPARATUS 207 | CAMERA 107 | IMAGE PROCESSING APPARATUS 206<br>IMAGE PROCESSING APPARATUS 208 | IMAGE PROCESSING APPARATUS 208 |
| IMAGE PROCESSING APPARATUS 208 | CAMERA 108 | IMAGE PROCESSING APPARATUS 207<br>IMAGE PROCESSING APPARATUS 209 | IMAGE PROCESSING APPARATUS 209 |
| IMAGE PROCESSING APPARATUS 209 | CAMERA 109 | IMAGE PROCESSING APPARATUS 208<br>IMAGE PROCESSING APPARATUS 210 | IMAGE PROCESSING APPARATUS 210 |
| IMAGE PROCESSING APPARATUS 210 | CAMERA 110 | IMAGE PROCESSING APPARATUS 209<br>IMAGE PROCESSING APPARATUS 211 | IMAGE PROCESSING APPARATUS 211 |
| IMAGE PROCESSING APPARATUS 211 | CAMERA 111 | IMAGE PROCESSING APPARATUS 210<br>AGGREGATION SERVER APPARATUS 500 | AGGREGATION SERVER APPARATUS 500 |

FIG.11

| IMAGE PROCESSING APPARATUS # | CONNECTED CAMERA # | LENS (mm) | CONNECTED APPARATUS | OUTPUT DESTINATION APPARATUS |
|---|---|---|---|---|
| IMAGE PROCESSING APPARATUS 200 | CAMERA 100 | 70 - 200 | AGGREGATION SERVER APPARATUS 500<br>IMAGE PROCESSING APPARATUS 201 | AGGREGATION SERVER APPARATUS 500 |
| IMAGE PROCESSING APPARATUS 201 | CAMERA 101 | 70 - 200 | IMAGE PROCESSING APPARATUS 200<br>IMAGE PROCESSING APPARATUS 202 | IMAGE PROCESSING APPARATUS 200 |
| IMAGE PROCESSING APPARATUS 202 | CAMERA 102 | 70 - 200 | IMAGE PROCESSING APPARATUS 201<br>IMAGE PROCESSING APPARATUS 203 | IMAGE PROCESSING APPARATUS 201 |
| IMAGE PROCESSING APPARATUS 203 | CAMERA 103 | 70 - 200 | IMAGE PROCESSING APPARATUS 202<br>IMAGE PROCESSING APPARATUS 204 | IMAGE PROCESSING APPARATUS 202 |
| IMAGE PROCESSING APPARATUS 204 | CAMERA 104 | 70 - 200 | IMAGE PROCESSING APPARATUS 203<br>IMAGE PROCESSING APPARATUS 205 | IMAGE PROCESSING APPARATUS 203 |
| IMAGE PROCESSING APPARATUS 205 | CAMERA 105 | 70 - 200 | IMAGE PROCESSING APPARATUS 204<br>IMAGE PROCESSING APPARATUS 206 | IMAGE PROCESSING APPARATUS 204 |
| IMAGE PROCESSING APPARATUS 206 | CAMERA 106 | 70 - 200 | IMAGE PROCESSING APPARATUS 205<br>IMAGE PROCESSING APPARATUS 207 | IMAGE PROCESSING APPARATUS 207 |
| IMAGE PROCESSING APPARATUS 207 | CAMERA 107 | 18 - 80 | IMAGE PROCESSING APPARATUS 206<br>IMAGE PROCESSING APPARATUS 208 | IMAGE PROCESSING APPARATUS 208 |
| IMAGE PROCESSING APPARATUS 208 | CAMERA 108 | 18 - 80 | IMAGE PROCESSING APPARATUS 207<br>IMAGE PROCESSING APPARATUS 209 | IMAGE PROCESSING APPARATUS 209 |
| IMAGE PROCESSING APPARATUS 209 | CAMERA 109 | 18 - 80 | IMAGE PROCESSING APPARATUS 208<br>IMAGE PROCESSING APPARATUS 210 | IMAGE PROCESSING APPARATUS 210 |
| IMAGE PROCESSING APPARATUS 210 | CAMERA 110 | 18 - 80 | IMAGE PROCESSING APPARATUS 209<br>IMAGE PROCESSING APPARATUS 211 | IMAGE PROCESSING APPARATUS 211 |
| IMAGE PROCESSING APPARATUS 211 | CAMERA 111 | 70 - 200 | IMAGE PROCESSING APPARATUS 210<br>AGGREGATION SERVER APPARATUS 500 | AGGREGATION SERVER APPARATUS 500 |

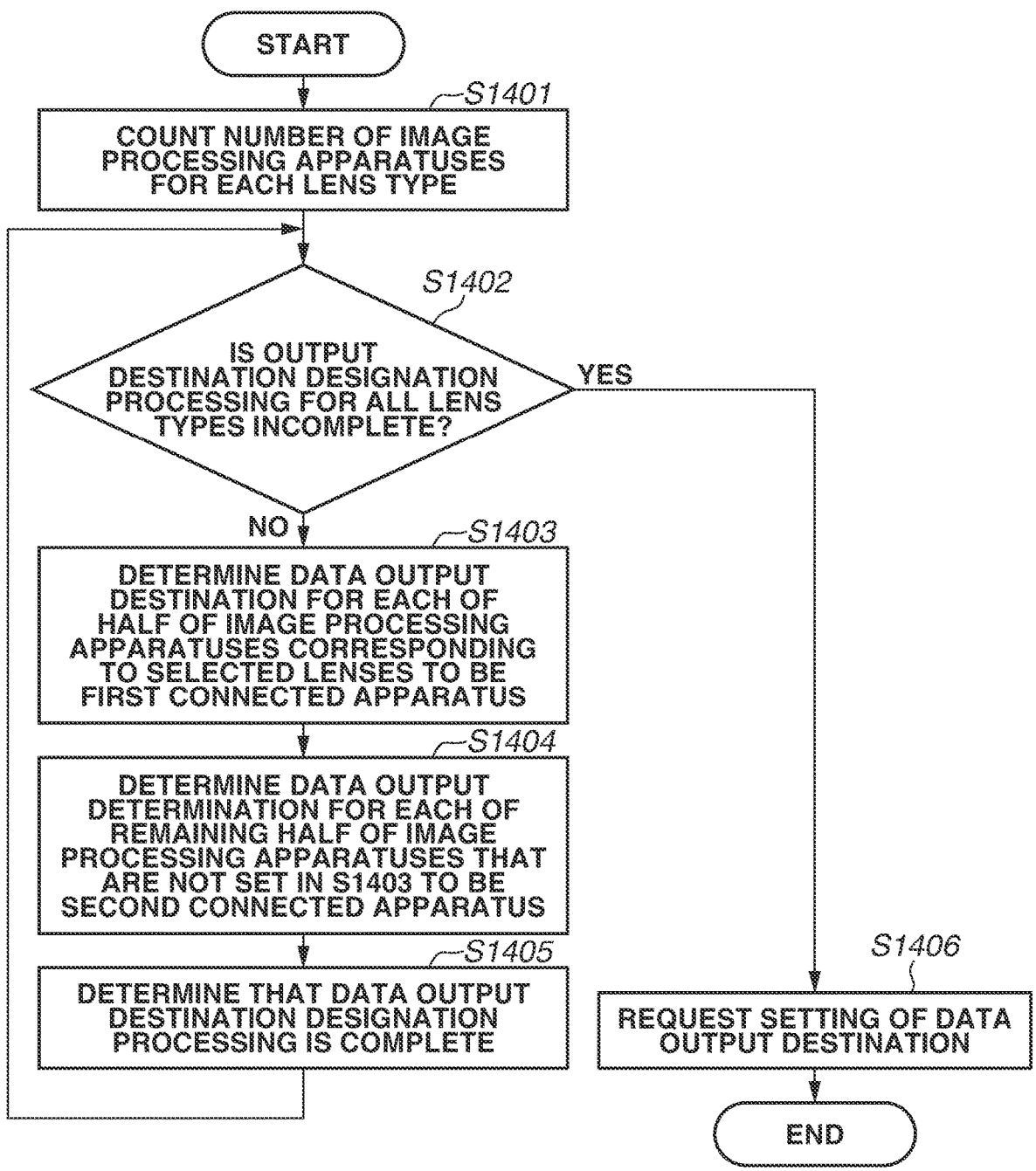

FIG.13

| IMAGE PROCESSING APPARATUS # | CONNECTED CAMERA # | LENS (mm) | CONNECTED APPARATUS | OUTPUT DESTINATION APPARATUS |
|---|---|---|---|---|
| IMAGE PROCESSING APPARATUS 200 | CAMERA 100 | 70 - 200 | AGGREGATION SERVER APPARATUS 500<br>IMAGE PROCESSING APPARATUS 201 | AGGREGATION SERVER APPARATUS 500 |
| IMAGE PROCESSING APPARATUS 201 | CAMERA 101 | 70 - 200 | IMAGE PROCESSING APPARATUS 200<br>IMAGE PROCESSING APPARATUS 202 | IMAGE PROCESSING APPARATUS 200 |
| IMAGE PROCESSING APPARATUS 202 | CAMERA 102 | 70 - 200 | IMAGE PROCESSING APPARATUS 201<br>IMAGE PROCESSING APPARATUS 203 | IMAGE PROCESSING APPARATUS 201 |
| IMAGE PROCESSING APPARATUS 203 | CAMERA 103 | 70 - 200 | IMAGE PROCESSING APPARATUS 202<br>IMAGE PROCESSING APPARATUS 204 | IMAGE PROCESSING APPARATUS 202 |
| IMAGE PROCESSING APPARATUS 204 | CAMERA 104 | 70 - 200 | IMAGE PROCESSING APPARATUS 203<br>IMAGE PROCESSING APPARATUS 205 | IMAGE PROCESSING APPARATUS 205 |
| IMAGE PROCESSING APPARATUS 205 | CAMERA 105 | 70 - 200 | IMAGE PROCESSING APPARATUS 204<br>IMAGE PROCESSING APPARATUS 206 | IMAGE PROCESSING APPARATUS 206 |
| IMAGE PROCESSING APPARATUS 206 | CAMERA 106 | 70 - 200 | IMAGE PROCESSING APPARATUS 205<br>IMAGE PROCESSING APPARATUS 207 | IMAGE PROCESSING APPARATUS 207 |
| IMAGE PROCESSING APPARATUS 207 | CAMERA 107 | 18 - 80 | IMAGE PROCESSING APPARATUS 206<br>IMAGE PROCESSING APPARATUS 208 | IMAGE PROCESSING APPARATUS 206 |
| IMAGE PROCESSING APPARATUS 208 | CAMERA 108 | 18 - 80 | IMAGE PROCESSING APPARATUS 207<br>IMAGE PROCESSING APPARATUS 209 | IMAGE PROCESSING APPARATUS 207 |
| IMAGE PROCESSING APPARATUS 209 | CAMERA 109 | 18 - 80 | IMAGE PROCESSING APPARATUS 208<br>IMAGE PROCESSING APPARATUS 210 | IMAGE PROCESSING APPARATUS 210 |
| IMAGE PROCESSING APPARATUS 210 | CAMERA 110 | 18 - 80 | IMAGE PROCESSING APPARATUS 209<br>IMAGE PROCESSING APPARATUS 211 | IMAGE PROCESSING APPARATUS 211 |
| IMAGE PROCESSING APPARATUS 211 | CAMERA 111 | 70 - 200 | IMAGE PROCESSING APPARATUS 210<br>AGGREGATION SERVER APPARATUS 500 | AGGREGATION SERVER APPARATUS 500 |

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

A technique for synchronously capturing images of an object from various directions by a plurality of image capturing units installed at different positions to generate a virtual viewpoint image using a plurality of captured images is known. The virtual viewpoint image enables a user to view from various viewpoints, which are different from the positions of the respective image capturing units, and thus provides a high realistic sensation to the user.

To generate the virtual viewpoint image, images captured by the plurality of image capturing units are aggregated at one location so that the captured images can be synchronously processed.

Japanese Patent Application Laid-Open No. 2017-211828 discusses a technique in which a plurality of cameras installed at different positions is connected in a daisy chain connection and images captured by the cameras are transmitted to a server and aggregated in the server.

For example, if an abnormality occurs in any one of a plurality of image capturing units connected in a daisy chain connection, there is a possibility that output data from other subsequent image capturing units cannot be successfully transmitted. In addition, an imbalance can occur in traffic on transmission paths of output data from the plurality of image capturing units connected in a daisy chain connection, so that an arrival of output data from some of the image capturing units at a transmission destination can be delayed. Thus, output data from each image capturing unit cannot be appropriately transmitted in some cases depending on the state of each of the plurality of image capturing units connected in a daisy chain connection.

SUMMARY

An exemplary embodiment of the present disclosure is directed to more appropriately transmitting image data output from image capturing units connected in a daisy chain connection.

According to an aspect of the present disclosure, an information processing apparatus includes an acquisition unit configured to acquire state information indicating a state of each of a plurality of image capturing units connected in a daisy chain connection, the plurality of image capturing units being configured to acquire image data to be transmitted to an image generation apparatus in accordance with the daisy chain connection, the image generation apparatus being configured to generate an image corresponding to a designated viewpoint, and a change unit configured to change an output destination of the image data for at least one image capturing unit included in the plurality of image capturing units based on the state information acquired by the acquisition unit.

Further features of the present invention will become apparent from the following description of exemplary embodiments with reference to the attached drawings.

BRIEF DESCRIPTION OF THE DRAWINGS

FIG. 4 illustrates an example of an output destination table.

FIG. 5 is a flowchart illustrating an example of processing to be performed by the control apparatus.

FIG. 7 illustrates an example of the output destination table.

FIG. 9 is a flowchart illustrating an example of processing to be performed by the control apparatus.

FIG. 10 illustrates an example of the output destination table.

FIG. 11 illustrates an example of the output destination table.

FIG. 12 is a flowchart illustrating an example of processing to be performed by the control apparatus.

FIG. 13 illustrates an example of the output destination table.

DESCRIPTION OF THE EMBODIMENTS

Exemplary embodiments of the present disclosure will be described in detail below with reference to the accompanying drawings.

An image capturing system according to a first exemplary embodiment is a system that aggregates images captured by a plurality of image capturing units in a data aggregation server and generates a virtual viewpoint image based on the aggregated images. According to the first exemplary embodiment, if a communication abnormality occurs in any one of the image capturing units connected in a daisy chain connection, the image capturing system controls a transmission path of output data so that image capturing units subsequent to the image capturing unit in which the abnormality has occurred can transmit output data to the server.

Figure 1:
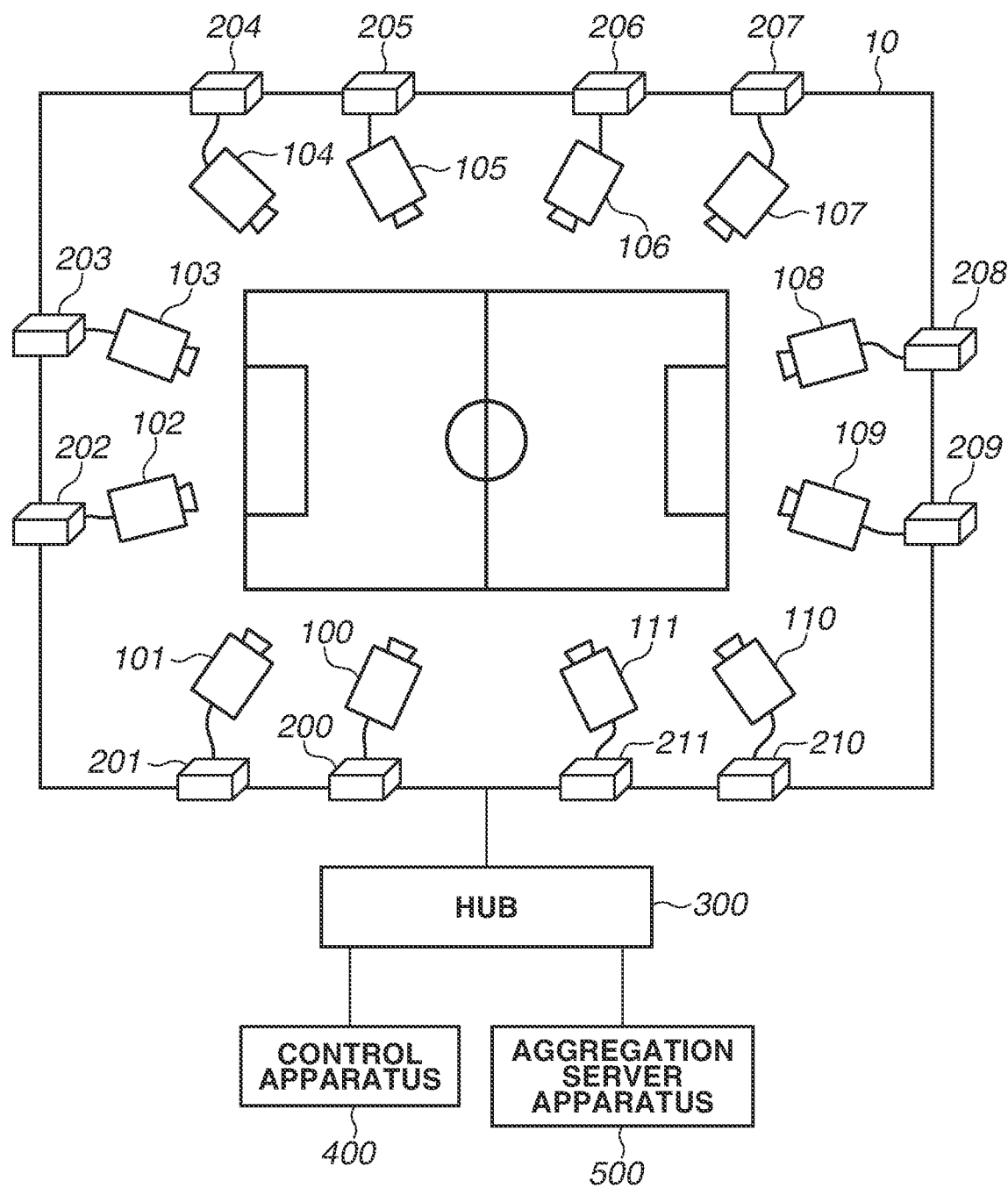
FIG. 1 illustrates a system configuration example of an image capturing system.

FIG. 1 illustrates a system configuration example of the image capturing system according to the first exemplary embodiment. The image capturing system includes cameras 100 to 111, image processing apparatuses 200 to 211, a HUB 300, a control apparatus 400, and an aggregation server apparatus 500.

Each of the image processing apparatuses 200 to 211 and the HUB 300 are connected in a daisy chain connection via a transmission cable. In other words, a circular network is formed by connecting each of the image processing apparatuses 200 to 211 and the HUB 300 as nodes. Examples of the transmission cable include a Gigabit Ethernet® (GbE) cable compliant with Ethernet®, which is an Institute of Electrical and Electronics Engineers (IEEE) standard, a 10-GbE cable, and a fiber channel.

A network 10 includes the above-described circular network. In the network 10, the image processing apparatuses 200 to 211, the HUB 300, the control apparatus 400, and the aggregation server apparatus 500 are connected as nodes.

Each of the cameras 100 to 111 is an image capturing apparatus that includes an image sensor and a lens, and captures an image, sound, and the like. Examples of the cameras 100 to 111 include a digital camera, a digital video camera, and a monitoring camera. In the first exemplary embodiment, the cameras 100 to 111 are installed on an outer periphery of a stadium in such a manner that the cameras 100 to 111 surround the stadium. In another example, each of the cameras 100 to 111 may be installed at any location where an image of the inside of a stadium can be captured, instead of installing the cameras 100 to 111 on the outer periphery of the stadium. Further, each of the cameras 100 to Ill 1 may be installed at a location other than a stadium. For example, each of the cameras 100 to 111 may be installed in a live event venue, a conference center, or a park.

The image processing apparatuses 200 to 211 are information processing apparatuses that are connected to the cameras 100 to 111, respectively, and control the respective connected cameras. A pair of an image processing apparatus and a camera that are connected together is herein referred to as an image capturing unit of the image capturing system. However, the image capturing unit may indicate only the image processing apparatus, or may indicate only the camera. In the first exemplary embodiment, each of the image processing apparatuses 200 to 211 transmits image data obtained by capturing an image by the corresponding camera as output data to the aggregation server apparatus 500 via the network 10.

Each of the image processing apparatuses 200 to 211 has a function of extracting data to be used for generating a virtual viewpoint image from the image data acquired from the corresponding camera. Each of the image processing apparatuses 200 to 211 can extract, for example, only an object portion from the image data input from the corresponding camera, and can transmit only image data on an area where an object is included in the image data to the aggregation server apparatus 500. Further, each of the image processing apparatuses 200 to 211 can extract audio data in the stadium from audio data acquired from the corresponding camera, and can transmit the extracted audio data to the aggregation server apparatus 500. Each of the image processing apparatuses 200 to 211 transmits output destination information, which indicates an apparatus to which data to be transmitted to the aggregation server apparatus 500 is directly output, to the control apparatus 400 via the network 10.

In the first exemplary embodiment, assume that each of the image processing apparatuses 200 to 211 outputs, as output data, image data obtained by capturing an image by the corresponding camera. In another example, each of the image processing apparatuses 200 to 211 may output data other than image data as output data.

For example, each of the image processing apparatuses 200 to 211 may output, as output data, image data extracted from image data obtained by capturing an image by the corresponding camera. Further, for example, each of the image processing apparatuses 200 to 211 may output, as output data, audio data acquired through a microphone included in the corresponding camera. Furthermore, for example, each of the image processing apparatuses 200 to 211 may output, as output data, image data and audio data which are acquired through the corresponding camera.

The HUB 300 is a line concentration apparatus used for communication between connected apparatuses. The HUB 300 transmits, as needed, information transmitted from the image processing apparatuses 200 to 211 to the control apparatus 400 and the aggregation server apparatus 500.

The control apparatus 400 is an information processing apparatus that controls each of the image processing apparatuses 200 to 211 via the network 10. In the first exemplary embodiment, assume that the control apparatus 400 is a personal computer (PC). In another example, the control apparatus 400 may be an information processing apparatus other than a PC, such as a server apparatus, a tablet apparatus, or an embedded computer.

The control apparatus 400 causes a display unit to display information indicating a direct output destination of output data for each of the image processing apparatuses 200 to 211. The direct output destination of output data is hereinafter referred to as a data output destination. Display contents will be described below with reference to FIGS. 8A and 8B. The control apparatus 400 determines whether the data output destination for any one of the image processing apparatuses 200 to 211 needs to be changed. If it is determined that the data output destination needs to be changed, information indicating a new data output destination is transmitted to the corresponding image processing apparatus.

The aggregation server apparatus 500 aggregates image data transmitted from the image processing apparatuses 200 to 211 as data for generating a virtual viewpoint image, and generates a virtual viewpoint image using the aggregated data. In the first exemplary embodiment, assume that the aggregation server apparatus 500 is a PC. In another example, the aggregation server apparatus 500 may be an information processing apparatus other than a PC, such as a server apparatus. The aggregation server apparatus 500 is an example of an image generation apparatus. The virtual viewpoint image is, for example, an image corresponding to a virtual viewpoint designated by a user. The virtual viewpoint need not necessarily be designated by the user. For example, the virtual viewpoint may be automatically designated or set by an apparatus. The designation of the virtual viewpoint includes designation of at least a position and a direction of the virtual viewpoint.

The aggregation server apparatus 500 has a function of generating a virtual viewpoint image using aggregated data. In the first exemplary embodiment, assume that the aggregation server apparatus 500 is a single information processing apparatus. In another example, the aggregation server apparatus 500 may be a system composed of two or more information processing apparatuses.

A flow of data to be transmitted from each of the image processing apparatuses 200 to 211 to the aggregation server apparatus 500 will now be described.

Each of the image processing apparatuses 201 to 210 directly outputs data to be transmitted to the aggregation server apparatus 500 to an image processing apparatus selected from among two adjacent image processing apparatuses. Upon receiving the data from one of the two adjacent image processing apparatuses, each of the image processing apparatuses 201 to 210 performs the following processing. That is, if the received data is data to be transmitted to the selected image processing apparatus, each of the image processing apparatuses 201 to 210 directly acquires the data, and if the received data is not data to be transmitted to the selected image processing apparatus, each of the image processing apparatuses 201 to 210 outputs the received data to the other one of the two adjacent image processing apparatuses. For example, if the image processing apparatus 205 receives data to be transmitted to the aggregation server apparatus 500 from the image processing apparatus 206, the image processing apparatus 205 outputs the received data to the image processing apparatus 204. Thus, data output from any one of the image processing apparatuses 201 to 210 is output to one of the image processing apparatuses 200 and 211. Upon receiving data from the adjacent image processing apparatus, each of the image processing apparatuses 200 and 211 outputs the received data to the aggregation server apparatus 500. Further, each of the image processing apparatuses 200 and 211 directly outputs data to be transmitted to the aggregation server apparatus 500 to the aggregation server apparatus 500. In this manner, each of the image processing apparatuses 200 to 211 transmits data to the aggregation server apparatus 500. Further, each of the image processing apparatuses 200 to 211 transmits data to the control apparatus 400 by processing similar to that described above.

Processing in which the control apparatus 400 transmits data to any one of the image processing apparatuses 200 to 211 will be described. The control apparatus 400 directly outputs data to the image processing apparatuses 200 and 211. In the case of transmitting data to any one of the image processing apparatuses 201 to 210, the control apparatus 400 first outputs the data to both the image processing apparatuses 200 and 211. Then, each of the image processing apparatuses 200 and 211 outputs the received data to the adjacent image processing apparatus. Thus, the data is transmitted to a transmission destination through two transmission paths (i.e., a path that passes through the image processing apparatus 200, and a path that passes through the image processing apparatus 211). With this configuration, for example, even if an abnormality occurs in the image processing apparatus 203 when the control apparatus 400 transmits data to the image processing apparatus 205, the data can be successfully transmitted through the path that passes through the image processing apparatus 211.

As described above, even if an abnormality occurs in any one of the image processing apparatuses 200 to 211, the control apparatus 400 can transmit the data to the other image processing apparatuses.

Figure 2:
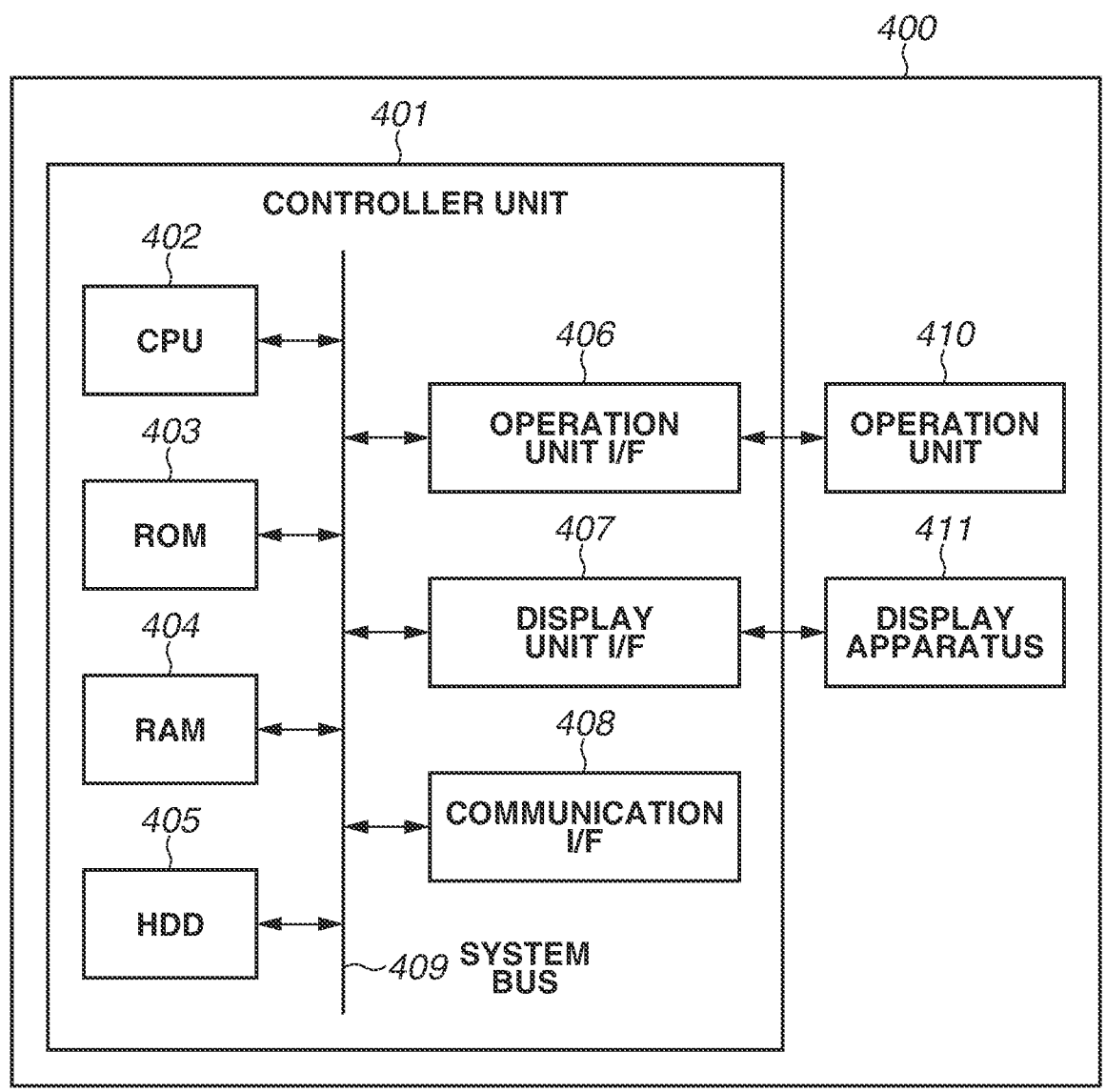
FIG. 2 is a block diagram illustrating a hardware configuration example of a control apparatus.

FIG. 2 is a block diagram illustrating an hardware configuration example of the control apparatus 400. The control apparatus 400 includes a controller unit 401, an operation unit 410, and a display apparatus 411. The controller unit 401 is a unit that controls the control apparatus 400. The controller unit 401 includes a central processing unit (CPU) 402, a read-only memory (ROM) 403, and a random access memory (RAM) 404. The controller unit 401 also includes a hard disk drive (HDD) 405, an operation unit interface (I/F) 406, a display unit I/F 407, and a communication I/F 408. These elements are communicably connected via the system bus 409.

The CPU 402 is a central processing unit that controls the control apparatus 400. The CPU 402 boots an operating system (OS) based on a boot program stored in the ROM 403. The CPU 402 executes application programs stored in the HDD 405 on the OS. The CPU 402 executes the application programs to thereby implement various kinds of processing.

The ROM 403 is a storage device that stores various kinds of programs and various kinds of setting information. The RAM 404 is a storage device that functions as a work area for the CPU 402, a storage area for temporarily storing data, and the like. The HDD 405 is a storage device that stores various programs, various kinds of setting information, and the like.

The operation unit I/F 406 is an interface used to input information to the operation unit 410 and output information from the operation unit 410. The CPU 402 acquires information input by the user operating the operation unit 410 via the operation unit I/F 406. The operation unit 410 is an input device used to input information to the control apparatus 400. Examples of the operation unit 410 include a mouse, a keyboard, and a touch panel.

The display unit I/F 407 is an interface used to output information to the display apparatus 411. The CPU 402 outputs image data to the display apparatus 411 via the display unit I/F 407. The display apparatus 411 is a display apparatus including a frame buffer and a display panel. Examples of the display apparatus 411 include a monitor and a display. Examples of the display panel include a liquid crystal panel and an organic electroluminescence (EL) panel.

The communication I/F 408 is an interface used to communicate with an external apparatus via the network 10. The communication I/F 408 is connected to a transmission cable. The CPU 402 inputs information to an external apparatus and outputs information from the external apparatus via the communication I/F 408. Examples of the external apparatus include a user terminal, the HUB 300, and the image processing apparatuses 200 to 211.

A hardware configuration example of the control apparatus 400 according to the first exemplary embodiment has been described above. In another example, the control apparatus 400 may have a hardware configuration different from that illustrated in FIG. 1. For example, the control apparatus 400 may not include the display apparatus 411. In this case, the control apparatus 400 may cause an external display apparatus connected via the communication I/F 408 to display an image.

The CPU 402 executes processing based on programs stored in the ROM 403, the HDD 405, or the like, to thereby implement the function of the control apparatus 400 to be described below with reference to FIG. 3, processing in flowcharts to be described below with reference to FIGS. 5, 9, and 12, and the like.

Figure 3:
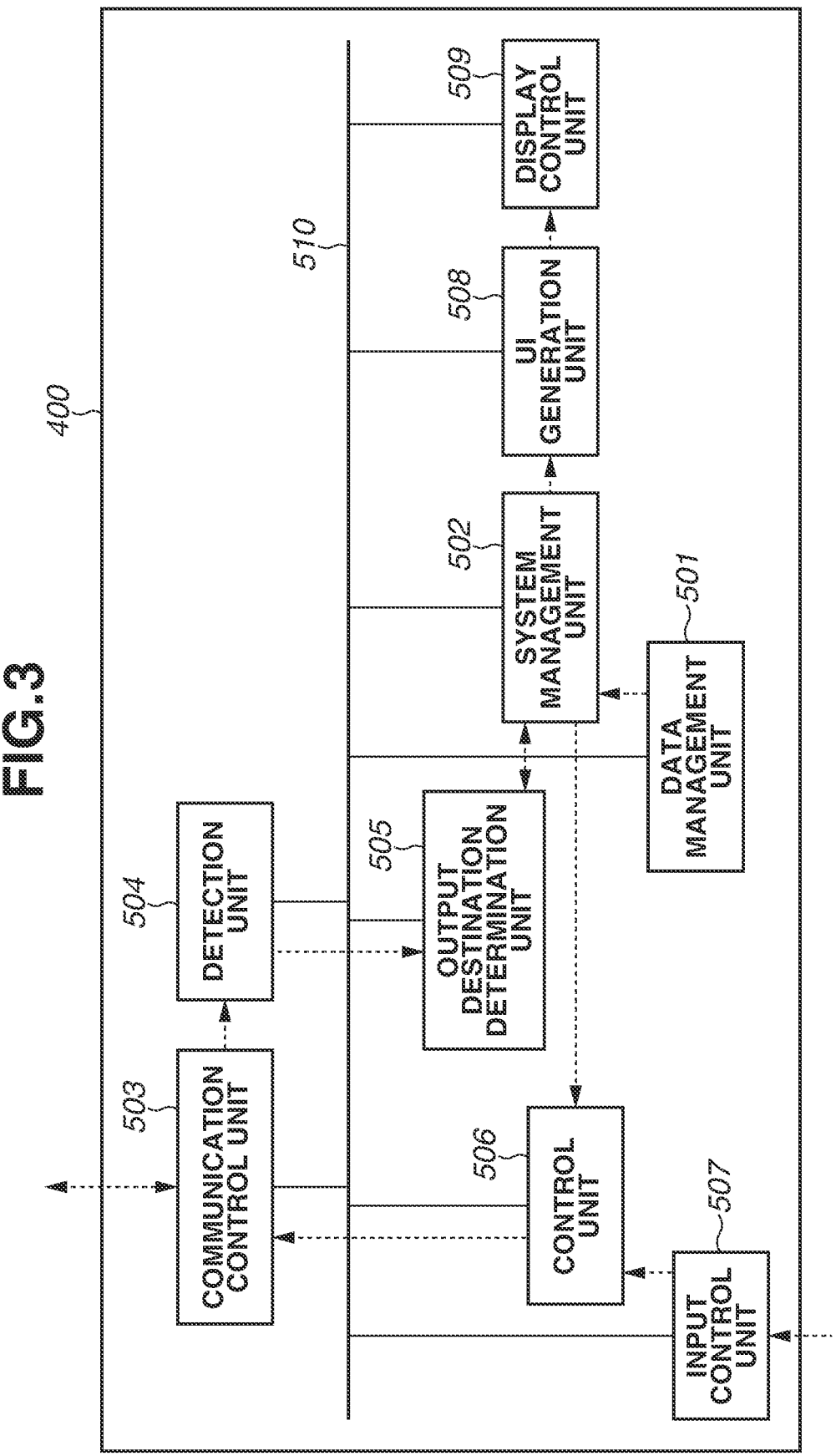
FIG. 3 is a block diagram illustrating a functional configuration example of the control apparatus.

FIG. 3 is a block diagram illustrating a functional configuration example of the control apparatus 400 according to the first exemplary embodiment. The control apparatus 400 includes a data management unit 501, a system management unit 502, a communication control unit 503, a detection unit 504, an output destination determination unit 505, a control unit 506, an input control unit 507, a user interface (UI) generation unit 508, and a display control unit 509. These elements are communicably connected via an internal bus 510.

The data management unit 501 stores output destination information indicating a data output destination for each of the image processing apparatuses 200 to 211 in the HDD 405, and manages the output destination information. In the first exemplary embodiment, the output destination information is managed as information stored in a table. The table that stores the output destination information is hereinafter referred to as an output destination table. In the first exemplary embodiment, the output destination table including information indicating predetermined initial values is stored in the HDD 405 in an initial state of the control apparatus 400. The output destination table includes information indicating a connected camera, information indicating apparatuses connected in a daisy chain connection via the network 10, and information indicating a data output destination, which are set for each of the image processing apparatuses 200 to 211.

FIG. 4 illustrates an example of the output destination table. The output destination table illustrated in FIG. 4 includes information indicating the predetermined initial values of the output destination table. The output destination table includes items of "image processing apparatus", "connected camera", "connected apparatus", and "output destination apparatus". The "image processing apparatus" item is an item indicating the corresponding image processing apparatus. The "connected camera" item is an item indicating a camera connected to the corresponding image processing apparatus. The "connected apparatus" item is an item indicating an apparatus that is directly connected to the corresponding image processing apparatus in a daisy chain connection, or is connected via the HUB 300. The "output destination apparatus" item is an item indicating a data output destination for the corresponding image processing apparatus.

The output destination table illustrated in FIG. 4 indicates that the image processing apparatus 201 is connected to the camera 101 and is connected to the image processing apparatus 200 and the image processing apparatus 202 in a daisy chain connection. The output destination table illustrated in FIG. 4 also indicates that the image processing apparatus 201 directly outputs output data to the image processing apparatus 200. Accordingly, the image processing apparatus 201 outputs the output data to the image processing apparatus 200 in the initial state.

The system management unit 502 performs processing for updating the output destination table managed by the data management unit 501. Upon updating the "output destination apparatus" item corresponding to any one of the image processing apparatuses in the output destination table, the system management unit 502 requests the control unit 506 to set the data output destination for the corresponding image processing apparatus. Further, the system management unit 502 outputs output destination information about each image processing apparatus to the UI generation unit 508. At start-up of the control apparatus 400, the data output destination is changed, for example, at a timing when the output destination determination unit 505 sends an instruction to change the data output destination.

The communication control unit 503 acquires an instruction to set the data output destination from the control unit 506, and instructs the corresponding image processing apparatus to set the data output destination. The instruction to set the data output destination is an instruction to be sent to the corresponding image processing apparatus and is made to instruct setting of the data output destination depending on the instruction. Further, the communication control unit 503 transmits a Keep-Alive signal to each of the image processing apparatuses 200 to 211 and receives the Keep-Alive signal from each of the image processing apparatuses 200 to 211, thereby periodically executing checking of the network connection. The Keep-Alive signal is a signal that is transmitted and received between each of the image processing apparatuses 200 to 211 and the control apparatus 400 and is used to check a communication possible state in which the communication between each of the image processing apparatuses 200 to 211 and the control apparatus 400 can be established.

The detection unit 504 monitors the connection with each of the image processing apparatuses 200 to 211 via a network through the communication control unit 503, thereby detecting an abnormality that has occurred in the communication with each of the image processing apparatuses 200 to 211. The detection unit 504 detects that the transmission or reception of the Keep-Alive signal to or from any one of the image processing apparatuses 200 to 211 is inactive, thereby detecting a disconnection of communication (communication is inactive) with the image processing apparatus. Information indicating that the transmission or reception of the Keep-Alive signal to or from each of the plurality of image capturing units is inactive is an example of state information indicating a state of each of the plurality of image capturing units. The detection unit 504 outputs a notification indicating that a communication disconnection has occurred in the image processing apparatus to the output destination determination unit 505. The communication disconnection means that the output of data from the image processing apparatus is interrupted. Accordingly, in the daisy chain connection configuration, the subsequent image processing apparatuses that transmit output data to the transmission destination via the image processing apparatus from which the output of data is interrupted cannot transmit the output data to the aggregation server apparatus 500.

Upon receiving the notification indicating the occurrence of the abnormality from the detection unit 504, the output destination determination unit 505 identifies, based on the received notification, the image processing apparatus in which the communication disconnection has occurred. Then, the output destination determination unit 505 instructs the system management unit 502 to update the data on the identified image processing apparatus in the output destination table.

The control unit 506 generates information indicating the designation of the data output destination for each of the image processing apparatuses 200 to 211 based on information about the output destination apparatus described in the output destination table acquired from the system management unit 502, and transmits the generated information to the communication control unit 503.

The input control unit 507 receives information input through the operation unit 410, and outputs the received information to the control unit 506.

The UI generation unit 508 generates a UI image based on the output destination table acquired from the system management unit 502, and outputs the generated UI image to the display control unit 509.

The display control unit 509 overwrites the frame buffer of the display apparatus 411 with the UI image output from the UI generation unit 508, reads out the UI image stored in the frame buffer at a predetermined refresh rate, and displays the UI image on the display panel of the display apparatus 411.

Processing in which the control apparatus 400 changes the data output destination for each of the image processing apparatuses 200 to 211 will be described with reference to FIG. 5. Before the processing illustrated in FIG. 5 is started, the output destination determination unit 505 prepares a change target list, which is list-format information for storing a list of information about image processing apparatuses for which the data output destination is changed, in the RAM 404. Before the processing illustrated in FIG. 5 is started, no information about the image processing apparatuses 200 to 211 is stored in the change target list.

In step S801, the output destination determination unit 505 determines whether an abnormality notification is received from the detection unit 504. If the output destination determination unit 505 determines that the abnormality notification is received from the detection unit 504 (YES in step S801), the output destination determination unit 505 identifies, based on the received notification, the image processing apparatus in which the communication disconnection has occurred from among the image processing apparatuses 200 to 211, and then the processing proceeds to step S802. The output destination determination unit 505 sets the identified image processing apparatus as an apparatus A. If the output destination determination unit 505 determines that the abnormality notification is not received from the detection unit 504 (NO in step S801), the processing returns to step S801.

In the first exemplary embodiment, the image processing apparatus which is identified in step S801 and in which the communication disconnection has occurred is determined to be an abnormal apparatus.

In step S802, the output destination determination unit 505 checks, based on the output destination table, whether there is any image processing apparatus that directly outputs output data to the apparatus A. Specifically, the output destination determination unit 505 checks whether data on the image processing apparatus identified in step S801 is stored in the "output destination apparatus" item of the output destination table.

If the output destination determination unit 505 determines that the image processing apparatus is present, the output destination determination unit 505 determines the image processing apparatus that is determined to be present in step S802 to be an apparatus B. If the output destination determination unit 505 determines that the image processing apparatus is not present, the output destination determination unit 505 determines that the apparatus B is not present.

In step S803, the output destination determination unit 505 determines whether the apparatus B is present. If the output destination determination unit 505 determines that the apparatus B is present (YES in step S803), the processing proceeds to step S804. If the output destination determination unit 505 determines that the apparatus B is not present (NO in step S803), the output destination determination unit 505 instructs the system management unit 502 to change the data output destination for each of the image processing apparatuses in the change target list stored in the RAM 404, and then the processing proceeds to step S806.

In step S804, the output destination determination unit 505 adds information about the apparatus B to the charge target list stored in the RAM 404.

In step S805, the output destination determination unit 505 determines the apparatus B to be a new apparatus A, and then the processing returns to step S802.

The output destination determination unit 505 repeatedly performs the processing of steps S802 to S805, thereby making it possible to store information about a list of image processing apparatuses that transmit output data to the aggregation server apparatus 500 via the abnormal apparatus identified in step S801 in the change target list. In other words, information about a list of image processing apparatuses that cannot transmit output data to the aggregation server apparatus 500 due to the effect of the abnormal apparatus is stored in the change target list.

In step S806, the system management unit 502 changes the data output destination for each of the image processing apparatuses stored in the change target list so that the output data can be transmitted to the aggregation server apparatus 500 without passing through the abnormal apparatus, thereby changing the direction of the transmission path of the output data. According to the first exemplary embodiment, two apparatuses (two adjacent image processing apparatuses, or an adjacent image processing apparatus and the aggregation server apparatus 500) are present as candidates for the data output destination for each of the image processing apparatuses 200 to 211. The system management unit 502 determines one of the two candidates that is different from the candidate indicated in the "output destination apparatus" item of the output destination table at the time of processing to be the data output destination for each of the image processing apparatuses stored in the change target list.

Further, the system management unit 502 updates the information about the "output destination apparatus" item for each of the image processing apparatuses stored in the change target list in the output destination table with information about the determined data output destination.

In step S807, the system management unit 502 instructs the control unit 506 to change the data output destination to the data output destination determined in step S806 for each of the image processing apparatuses stored in the change target list. Upon receiving this instruction, the control unit 506 transmits an instruction to change the data output destination to the data output destination determined in step S806 to each of the image processing apparatuses stored in the change target list. As a result, the data output destination for each of the image processing apparatuses stored in the change target list is changed.

In this manner, the control apparatus 400 controls the direction of the transmission path of the output data for each of the image processing apparatuses stored in the change target list to be changed so that the transmission path is prevented from passing through the abnormal apparatus.

A case where an abnormality, i.e., a communication disconnection, occurs in the image processing apparatus 203 will now be described.

Upon acquiring a notification indicating the occurrence of the abnormality from the detection unit 504, the output destination determination unit 505 checks the output destination apparatus in the output destination table, and checks whether there is any image processing apparatus that directly outputs output data to the image processing apparatus 203. As a result, the output destination determination unit 505 determines that the image processing apparatus 204 is present, and adds the image processing apparatus 204 to the change target list.

Figure 6:
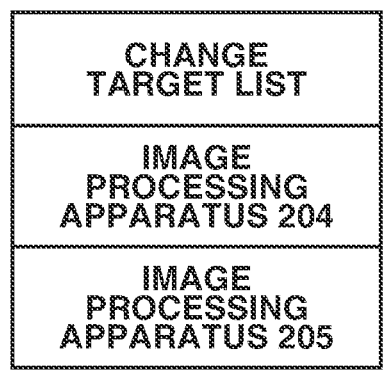
FIG. 6 illustrates an example of a list of output destination change target apparatuses.

Next, the output destination determination unit 505 checks the output destination in the output destination table, and checks whether there is any image processing apparatus that directly outputs output data to the image processing apparatus 204. As a result, the output destination determination unit 505 determines that the image processing apparatus 205 is present, and adds the image processing apparatus 205 to the change target list. The output destination determination unit 505 checks the output destination apparatus in the output destination table, and checks whether there is any image processing apparatus that directly outputs output data to the image processing apparatus 205. As a result, the output destination determination unit 505 determines that there is no image processing apparatus that directly outputs output data to the image processing apparatus 205. In this case, as illustrated in FIG. 6, the change target list includes information about the image processing apparatus 204 and the image processing apparatus 205.

Then, the system management unit 502 acquires the change target list, and changes the information about the output destination apparatus for each of the image processing apparatuses included in the change target list in the output destination table. In an example illustrated in FIG. 6, the system management unit 502 identifies that the image processing apparatus 203 and the image processing apparatus 205 are connected to the image processing apparatus 204 described in the change target list based on the "connected apparatus" item of the output destination table. Then, the system management unit 502 changes the "output destination apparatus" item corresponding to the image processing apparatus 204 in the output destination table from the image processing apparatus 203 to the image processing apparatus 205. Similarly, the system management unit 502 changes the "output destination apparatus" item corresponding to the image processing apparatus 205 in the output destination table to the image processing apparatus 206. FIG. 7 illustrates the changed output destination table. As seen from FIG. 7, the contents of the "output destination apparatus" item corresponding to the image processing apparatuses 204 and 205 are changed from the contents illustrated in FIG. 4.

Figure 8A:
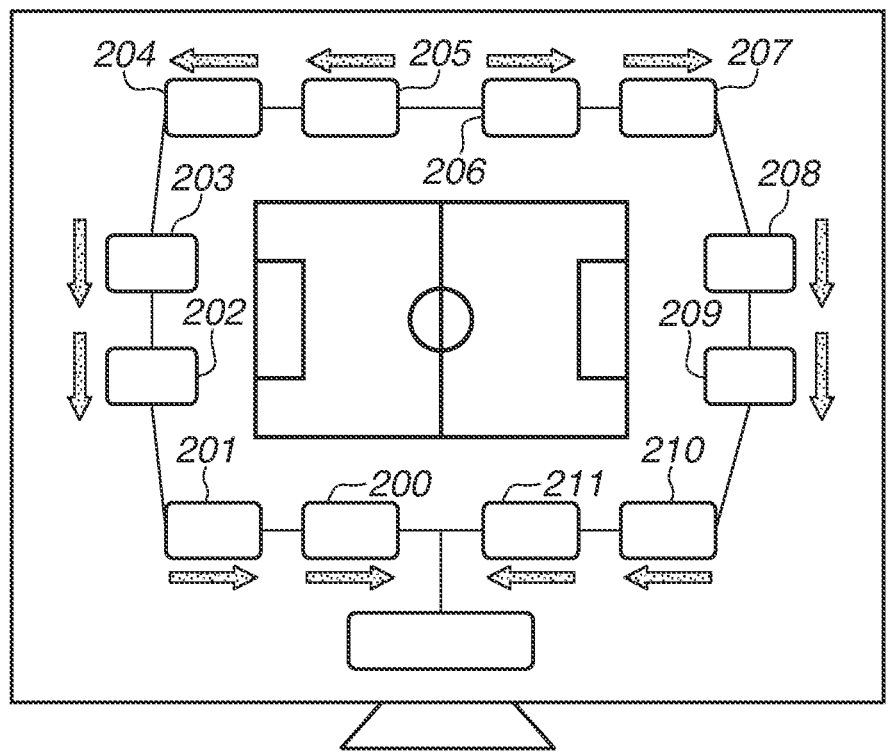
FIGS. 8A and 8B each illustrate an example of a screen on which output destination information is displayed.

Processing in which the display control unit 509 causes the display apparatus 411 to display information about the output destination apparatus for each of the image processing apparatuses 200 to 211 will be described with reference to FIGS. 8A and 8B. When all the image processing apparatuses 200 to 211 are normally operating, the display control unit 509 causes the display apparatus 411 to display an image illustrated in FIG. 8A. FIG. 8A illustrates a state where the image processing apparatuses 200 to 211 are connected in a daisy chain connection. In an example illustrated in FIG. 8A, the display control unit 509 causes the display apparatus 411 to display respective objects representing the image processing apparatuses 200 to 211, and a solid line (indicating a cable used for connection between the image processing apparatuses) that connects the objects.

In the vicinity of each of the respective objects representing the image processing apparatuses 200 to 211, the display control unit 509 displays an arrow object indicating the direction of the output destination apparatus corresponding to each image processing apparatus. The arrow object indicates the direction of the data output destination of the corresponding image processing apparatus (the direction of the transmission path of output data). The image processing apparatus 205 is described by way of example. The output data from the image processing apparatus 205 is directly output to the image processing apparatus 204, and is then transmitted to the aggregation server apparatus 500 via the image processing apparatuses 203, 202, 201, and 200.

Figure 8B:
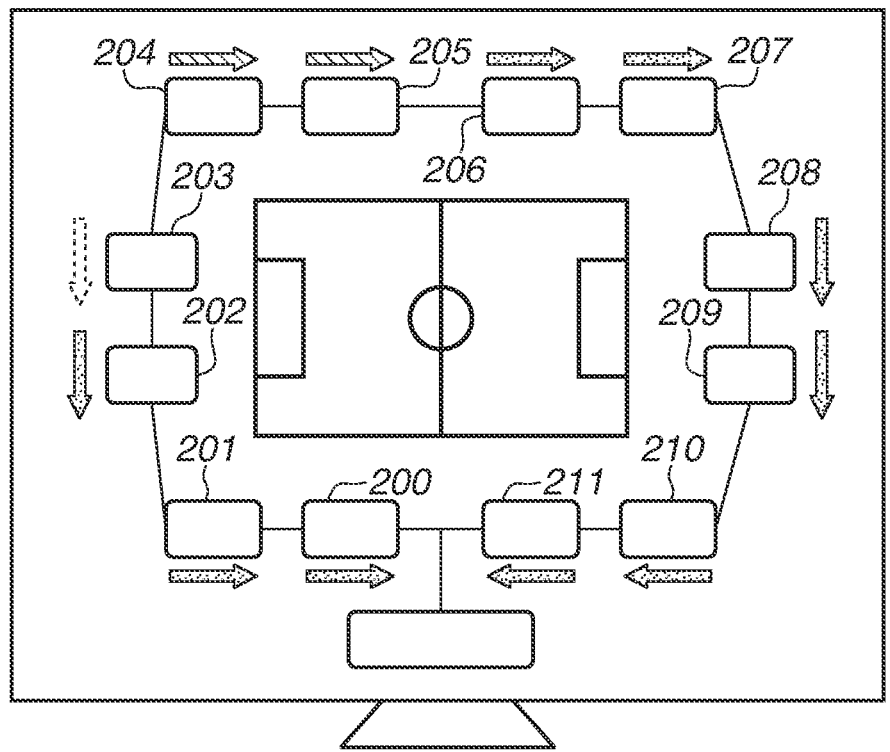

In a case where an abnormality, i.e., a communication disconnection, has occurred in the image processing apparatus 203 and the processing illustrated in FIG. 5 is executed, the display control unit 509 causes the display apparatus 411 to display an image illustrated in FIG. 8B. The display control unit 509 displays an arrow object corresponding to the image processing apparatus 203 in which the communication disconnection has occurred as a dotted line. This enables the display control unit 509 to present, to the user, information indicating that the communication abnormality has occurred in the image processing apparatus 203. In another example, the display control unit 509 may display the arrow object corresponding to the image processing apparatus 203 in another format such as a blinking display. Alternatively, the display control unit 509 may not display the arrow object corresponding to the image processing apparatus 203.

As for the respective arrow objects corresponding to the image processing apparatus 204 and the image processing apparatus 205, for which the output destination apparatus has been changed, the display control unit 509 displays the arrow objects in a format different from the respective arrow objects corresponding to the image processing apparatuses, for which the data output destination has not been changed. In the first exemplary embodiment, the display control unit 509 displays the respective arrow objects corresponding to the image processing apparatus 204 and the image processing apparatus 205, for which the output destination apparatus has been changed, with different colors. This enables the display control unit 509 to present, to the user, information indicating that the data output destination for each of the image processing apparatus 204 and the image processing apparatus 205 has been changed. In another example, the display control unit 509 may display the respective arrow objects corresponding to the image processing apparatus 204 and the image processing apparatus 205, for which the data output destination has been changed, in another format such as a blinking display, or a thick-line display.

The image capturing system may change the data output destination for any one of the image processing apparatuses 200 to 211 based on information input through the operation unit 410. For example, the image capturing system may change the data output destination for the image processing apparatuses corresponding to the objects, which represent the image processing apparatuses 200 to 211 displayed on the display control unit 509, in response to, for example, a click operation on the objects.

As described above, in the first exemplary embodiment, upon receiving a notification indicating that a communication disconnection has occurred in any one of the image processing apparatuses 200 to 211, the image capturing system performs the following processing. That is, the image capturing system changes the data output destination for each of the image processing apparatuses that transmit output data via the image processing apparatus indicated by the received notification, thereby changing the direction of the transmission path of the output data. With this configuration, the image capturing system can avoid a situation where output data from subsequent image processing apparatuses cannot be successfully transmitted, even if an abnormality, i.e., a communication disconnection, occurs in any one of the image processing apparatuses connected in a daisy chain connection. That is, the image capturing system can support more appropriate transmission of output data from a plurality of image processing apparatuses connected in a daisy chain connection. Consequently, the image capturing system can prevent deterioration in the quality of the virtual viewpoint image generated based on the transmitted output data.

According to a second exemplary embodiment, the image capturing system changes the direction of the transmission path of output data for each of the image capturing units depending on a usage amount of communication band for each of the image capturing units.

In the case of transmitting output data from any one of the image processing apparatuses 201 to 210 to the aggregation server apparatus 500, the output data is transmitted through two transmission paths, i.e., a transmission path that passes through the image processing apparatus 200, and a transmission path that passes through the image processing apparatus 211. In an example illustrated in FIG. 1, the two transmission paths are a clockwise transmission path (corresponding to the transmission path that passes through the image processing apparatus 211) on the circular network composed of the image processing apparatuses 200 to 211 connected in a daisy chain connection, and a counterclockwise transmission path (corresponding to the transmission path that passes through the image processing apparatus 200). The transmission path that passes through the image processing apparatus 200 is hereinafter referred to as a first path. The transmission path that passes through the image processing apparatus 211 is hereinafter referred to as a second path.

In the second exemplary embodiment, the image capturing system monitors the usage amount of communication band on an output side for each of the image processing apparatus 200 and the image processing apparatus 211, thereby detecting an imbalance between traffic on the first path and traffic on the second path.

In the second exemplary embodiment, in the case of transmitting output data to be transmitted (a set of output data from all image processing apparatuses on the first path), the image processing apparatus 200 transmits information about the usage amount of communication band for transmission to the control apparatus 400. In the case of transmitting output data to be transmitted (a set of output data from all image processing apparatuses on the second path), the image processing apparatus 211 transmits information about the usage amount of communication band for transmission to the control apparatus 400. The control apparatus 400 acquires the information about the usage amount of communication band transmitted from each of the image processing apparatus 200 and the image processing apparatus 211, and compares the usage amounts, to thereby detect an imbalance between traffic on the first path and traffic on the second path. The information about the usage amount of communication band transmitted from each of the image processing apparatus 200 and the image processing apparatus 211 is an example of state information.

The system configuration of the image capturing system according to the second exemplary embodiment is similar to that of the first exemplary embodiment. The hardware configuration and the functional configuration of the control apparatus 400 according to the second exemplary embodiment are similar to those of the first exemplary embodiment.

In the second exemplary embodiment, processing to be performed by the communication control unit 503 and processing to be performed by the detection unit 504 are different from those of the first exemplary embodiment. The communication control unit 503 performs not only processing similar to that of the first exemplary embodiment, but also processing for checking the usage amount of communication band on the output side for each of the image processing apparatuses 200 and 211 for which the aggregation server apparatus 500 is set as the data output destination among the image processing apparatuses 200 to 211.

The detection unit 504 detects an imbalance between traffic on the first path and traffic on the second path based on the usage amount of communication band checked by the communication control unit 503. In the second exemplary embodiment, when a ratio of the value of the larger one of the usage amounts of communication band checked by the communication control unit 503 to the value of the smaller one of the usage amounts of communication band checked by the communication control unit 503 is more than or equal to a predetermined threshold (e.g., 120% or 150%), the detection unit 504 performs the following processing. That is, the condition that the ratio of the value of the larger one of the usage amounts of communication band for two image processing apparatuses to the smaller one of the usage amounts of communication band is more than or equal to the predetermined threshold is an example of a predetermined condition. In other words, the detection unit 504 detects an imbalance between traffic on the first path and traffic on the second path. In another example, the detection unit 504 may detect an imbalance between traffic on the first path and traffic on the second path by another method. For example, the detection unit 504 may detect an imbalance between traffic on the first path and traffic on the second path when the size of the difference between the usage amounts of communication band checked by the communication control unit 503 is more than or equal to a predetermined threshold.

Then, the detection unit 504 transmits a notification indicating the occurrence of an abnormality, i.e., an imbalance between traffic on the first path and traffic on the second path, to the output destination determination unit 505.

FIG. 9 is a flowchart illustrating an example of processing to be performed by the control apparatus 400 according to the second exemplary embodiment.

In step S901, the output destination determination unit 505 determines whether the notification indicating the occurrence of the abnormality is received from the detection unit 504. If the output destination determination unit 505 determines that the notification indicating the occurrence of the abnormality is received from the detection unit 504 (YES in step S901), the output destination determination unit 505 determines the image processing apparatus corresponding to the larger one of the usage amounts of communication band checked by the communication control unit 503 to be the apparatus A. Then, the processing proceeds to step S902. If the output destination determination unit 505 determines that the notification indicating the occurrence of the abnormality is not received from the detection unit 504 (NO in step S901), the processing returns to step S901.

In the second exemplary embodiment, the image processing apparatus corresponding to the larger one of the usage amounts of communication band checked by the communication control unit 503 is determined to be the abnormal apparatus.

In step S902, the output destination determination unit 505 identifies one of the image processing apparatuses 200 to 211 for which the apparatus A is set as the data output destination based on the output destination table. If the output destination determination unit 505 can identify the image processing apparatus for which the apparatus A is set as the data output destination, the output destination determination unit 505 determines the identified image processing apparatus to be the apparatus B. If there is no image processing apparatus for which the apparatus A is set as the data output destination, the output destination determination unit 505 determines that the apparatus B is not present.

In step S903, the output destination determination unit 505 determines whether the apparatus B is present. If the output destination determination unit 505 determines that the apparatus B is present (YES in step S903), the processing proceeds to step S904. If the output destination determination unit 505 determines that the apparatus B is not present (NO in step S903), the output destination determination unit 505 instructs the system management unit 502 to change the data output destination for the apparatus A. Then, the processing proceeds to step S905.

In step S904, the output destination determination unit 505 determines the apparatus B to be a new apparatus A, and then the processing returns to step S902.

In step S905, the system management unit 502 determines the data output destination for the apparatus A so that the output data can be transmitted to the aggregation server apparatus 500 without passing through the abnormal apparatus, thereby changing the direction of the transmission path of the output data. Then, the system management unit 502 updates the information about the "output destination apparatus" item for the apparatus A in the output destination table with information about the determined data output destination.

In step S906, the system management unit 502 instructs the control unit 506 to change the data output destination for the apparatus A to the data output destination determined in step S905. The control unit 506 which has received this instruction transmits, to the apparatus A, an instruction to change the data output destination to the data output destination determined in step S905.

In this manner, the control apparatus 400 controls the transmission path of output data for the apparatus A so that the transmission path is prevented from passing through the abnormal apparatus. The transmission path used for the apparatus A to transmit output data is changed to thereby reduce the imbalance between traffic on the first path and traffic on the second path.

A case where an imbalance occurs between traffic on the first path and traffic on the second path and the image processing apparatus 211 is determined to be the abnormal apparatus will now be described.

Upon receiving a notification indicating the occurrence of the abnormality from the detection unit 504, the output destination determination unit 505 checks the output destination apparatus in the output destination table, and checks whether there is any image processing apparatus that directly outputs output data to the image processing apparatus 211. Next, the output destination determination unit 505 checks the output destination apparatus in the output destination table, and checks whether there is any image processing apparatus that directly outputs output data to the image processing apparatus 210. As a result, the output destination determination unit 505 determines whether the image processing apparatus 209 is present. The output destination determination unit 505 repeatedly performs the above-described processing, and determines the image processing apparatus 206 to be the image processing apparatus that is farthest from the image processing apparatus 211 among the image processing apparatuses that transmit output data via the image processing apparatus 211. The term "farthest" means that the transmission path of output data passes through a largest number of nodes (image processing apparatuses).

Then, the system management unit 502 changes the information about the output destination apparatus for the image processing apparatus 206 in the output destination table. Specifically, the system management unit 502 changes the "output destination apparatus" item corresponding to the image processing apparatus 206 in the output destination table from the image processing apparatus 207 to the image processing apparatus 205. As a result, the contents of the output destination table as illustrated in FIG. 10 are obtained.

In the second exemplary embodiment, the image capturing system monitors the usage amount of communication band for each of the image processing apparatuses 200 and 211 that output data to the aggregation server apparatus 500, but instead may monitor the usage amount of communication band for each of the image processing apparatuses 200 to 211. Further, the image capturing system may store a maximum value of previous usage amounts of communication band for each of the image processing apparatuses 200 to 211 as a maximum communication band, and may set the data output destination for each of the image processing apparatuses 200 to 211 so that the total sum of maximum communication bands for each path can be smoothed.

According to the second exemplary embodiment, in the case of transmitting output data to be transmitted, each of the image processing apparatuses 200 and 211 transmits information about the usage amount of communication band for transmission to the control apparatus 400. Further, the control apparatus 400 acquires the information about the usage amount of communication band transmitted from each of the image processing apparatus 200 and the image processing apparatus 211, and compares the usage amounts, thereby detecting an imbalance between traffic on the first path and traffic on the second path.

In another example, the control apparatus 400 may detect an imbalance between traffic on the first path and traffic on the second path by another method.

For example, in the case of transmitting output data to be transmitted, each of the image processing apparatuses 200 and 211 may not transmit the information about the usage amount of communication band for transmission to the control apparatus 400. In this case, for example, the aggregation server apparatus 500 monitors the amount of data received from each of the image processing apparatus 200 and the image processing apparatus 211, and acquires the usage amount of communication band for each of the image processing apparatus 200 and the image processing apparatus 211. Then, the control apparatus 400 may acquire the information about the usage amount of communication band for each of the image processing apparatus 200 and the image processing apparatus 211 from the aggregation server apparatus 500, and may compare the usage amounts.

For example, the image processing apparatus 200 may transmit, to the control apparatus 400, information about the actual usage amount of communication band for transmitting the transmission target output data that has already been transmitted (a set of output data on all image processing apparatuses on the first path). Further, the image processing apparatus 211 may transmit, to the control apparatus 400, information about the usage amount of communication band for transmitting the transmission target output data that has already been transmitted (a set of output data on all image processing apparatuses on the second path).

Then, the control apparatus 400 may compare the usage amounts transmitted from the image processing apparatus 200 and the image processing apparatus 211, thereby detecting an imbalance between traffic on the first path and traffic on the second path.

For example, before transmitting output data, each of the image processing apparatuses 200 to 211 may transmit, to the control apparatus 400, the usage amount of communication band for transmission of output data for the corresponding image processing apparatus. Then, before each of the image processing apparatuses 200 to 211 starts transmission of output data, the control apparatus 400 acquires the usage amount of communication band for transmission of each piece of output data from the image processing apparatuses 200 to 211. Further, the control apparatus 400 acquires, as traffic on the first path, the total value of the usage amounts acquired from the image processing apparatuses on the first path. Furthermore, the control apparatus 400 acquires, as traffic on the second path, the total value of the usage amounts acquired from the image processing apparatuses on the second path. Then, the control apparatus 400 may compare the acquired traffic on the first path with the acquired traffic on the second path, thereby detecting an imbalance.

Thus, the control apparatus 400 can prevent the occurrence of an imbalance in traffic when output data is actually transmitted.

In the second exemplary embodiment, the control apparatus 400 determines the data output destination for only the apparatus A that is farthest from the abnormal apparatus in step S905. In another example, the control apparatus 400 may change the data output destination for two or more image processing apparatuses selected in a descending order of the number of image processing apparatuses through which the transmission path of the output data passes (or in a descending order of distance).

For example, the control apparatus 400 acquires the usage amount of communication band for transmission of the corresponding output data for each of the image processing apparatuses that transmit the output data via the abnormal apparatus. Then, the control apparatus 400 determines the image processing apparatus for which the data output destination is changed so that the imbalance between traffic on the first path and traffic on the second path can be reduced.

For example, the control apparatus 400 acquires, as the amount of imbalance, a half of the value of the difference between traffic on the first path and traffic on the second path. Then, the control apparatus 400 selects one or more image processing apparatuses from candidates for the apparatus A in a descending order of the number of nodes through which the transmission path of the output data passes from among the image processing apparatuses that transmit the output data via the abnormal apparatus. The control apparatus 400 selects one or more image processing apparatuses so that the difference between the amount of imbalance and the total of the usage amounts of communication band for each of the selected image processing apparatuses to transmit the output data is minimized. Then, the control apparatus 400 changes the data output destination for each of the image processing apparatuses selected when the absolute value of the obtained difference is minimized.

By the processing described above, the control apparatus 400 can more appropriately correct the imbalance between traffic on the first path and traffic on the second path.

By the processing according to the second exemplary embodiment described above, the image capturing system can avoid a situation where transmitted data is concentrated on one of the first path and the second path and an imbalance occurs between traffic on the first path and traffic on the second path.

According to a third exemplary embodiment, the image capturing system determines the data output destination for each image processing apparatus depending on a setting or a type of a lens to be mounted on each camera, thereby preventing an imbalance between traffic on one path and traffic on another path.

Apparatuses connected in a daisy chain connection transmit output data in addition to output data from other apparatuses, and thus may desirably transmit the output data with a minimum possible amount of data. Accordingly, in the third exemplary embodiment, assume that each of the image processing apparatuses 200 to 211 transmits only images of moving objects as output data. In this case, the number of objects included in a captured image tends to vary depending on the type of a lens used for each camera. For example, when a wide-angle lens that captures an image of a wide space is used, the number of objects included in the captured image tends to increase.

Accordingly, in the third exemplary embodiment, the image capturing system determines the transmission destination depending on the lens to be used by the corresponding camera for each of the image processing apparatuses 200 to 211, thereby making it possible to smooth the data to be transmitted.

The configuration of the image capturing system according to the third exemplary embodiment is similar to that of the first exemplary embodiment. The hardware configuration and the functional configuration of the control apparatus 400 according to the third exemplary embodiment are similar to those of the first exemplary embodiment.

FIG. 11 illustrates an example of the output destination table according to the third exemplary embodiment. The output destination table according to the third exemplary embodiment includes a "lens" item indicating the type of a lens mounted on the corresponding camera, unlike in the first exemplary embodiment. In the third exemplary embodiment, two lens types, i.e., a type of "18 to 80 mm" and a type of "70 to 200 mm", are used.

In the third exemplary embodiment, processing to be performed by the data management unit 501, processing to be performed by the system management unit 502, and processing to be performed by the output destination determination unit 505 are different from those of the first exemplary embodiment. The system management unit 502 acquires information about the output destination table from the data management unit 501 at start-up of the control apparatus 400, and then outputs the information about the output destination table to the output destination determination unit 505.

FIG. 12 is a flowchart illustrating an example of processing to be performed by the control apparatus 400 according to the third exemplary embodiment. The control apparatus 400 starts processing illustrated in FIG. 12 at start-up.

In step S1401, the output destination determination unit 505 checks the "lens" item of the output destination table acquired from the data management unit 501, and adds up the image processing apparatuses for each lens type. In an example illustrated in FIG. 11, the output destination determination unit 505 determines that the number of image processing apparatuses corresponding to the lens of the type "18 to 80 mm" is four and the number of image processing apparatuses corresponding to the lens of the type "70 to 200 mm" is eight.

In step S1402, the output destination determination unit 505 determines whether the processing of steps S1403 to S1405 for all lens types, i.e., the lens of the type "18 to 80 mm" and the lens of the type "70 to 200 mm", is complete. If the output destination determination unit 505 determines that the processing of steps S1403 to S1405 for all lenses is complete (NO in step S1402), the processing proceeds to step S1406. If the output destination determination unit 505 determines that there is any lens for which the processing of steps S1403 to S1405 is not complete (YES in step S1402), the output destination determination unit 505 determines one of the lenses for which the processing of steps S1403 to S1405 is not complete to be a selected lens. Then, the processing proceeds to step S1403.

In the third exemplary embodiment, the output destination determination unit 505 divides the image processing apparatuses corresponding to the selected lens into two groups, and determines the data output destination for each group.

In step S1403, the output destination determination unit 505 identifies a half of the image processing apparatuses corresponding to the selected lens. The output destination determination unit 505 determines the data output destination for each of the identified image processing apparatuses to be a first apparatus among the apparatuses indicated by the "connected apparatus" item of the output destination table. In other words, the output destination determination unit 505 determines the data output destination for each of the identified image processing apparatuses to be the connected apparatus on the first path.

In step S1404, the output destination determination unit 505 identifies the remaining half of the image processing apparatuses corresponding to the selected lens. The output destination determination unit 505 determines the data output destination for each of the identified image processing apparatuses to be a second apparatus among the apparatuses indicated by the "connected apparatus" item of the output destination table. In other words, the output destination determination unit 505 determines the data output destination for each of the identified image processing apparatuses to be the connected apparatus on the second path.

In step S1405, the output destination determination unit 505 determines that the determination of the data output destination for each of the image processing apparatuses corresponding to the selected lens is complete, and then the processing returns to step S1402.

In step S1406, the output destination determination unit 505 instructs the control unit 506 to set the data output destination for each of the image processing apparatuses 200 to 211. In the example illustrated in FIG. 11, the image processing apparatuses 206 and 207, each of which is the first apparatus described in the information about the "connected apparatus" item of the output destination table, are set as the data output destinations for the image processing apparatuses 207 and 208, respectively, among the four image processing apparatuses corresponding to the lens of the type "18 to 80 mm". The image processing apparatuses 210 and 211, each of which is the second apparatus described in the information about the "connected apparatus" item, are set as the data output destinations for the remaining half of the image processing apparatuses, i.e., the image processing apparatuses 209 and 210, respectively. The image processing apparatuses corresponding to the lens of the type "70 to 200 mm" are also divided into groups each including four image processing apparatuses, and the data output destination for each group is determined. FIG. 13 illustrates an example of the determination result of the data output destination by the processing described above.

In the third exemplary embodiment, the image capturing system determines the data output destination for each image processing apparatus depending on the type of a lens to be mounted on each camera. In another example, the image capturing system may determine the data output destination for each image processing apparatus depending on a focal length of a lens mounted on each camera. For example, information about the focal length of the corresponding lens is stored in the output destination table.

In this case, the image capturing system sorts the image processing apparatuses 200 to 211 in an ascending order of value of the focal length. Then, the image capturing system sets the connected apparatus on the first path as the output data destination for odd-numbered image processing apparatuses arranged as a result of sorting. Further, the image capturing system sets the connected apparatus on the second path as the data output destination for even-numbered image processing apparatuses arranged as a result of sorting.

By the processing according to the third exemplary embodiment described above, the image capturing system sets the data output destination for each image processing apparatus depending on the type of a lens mounted on each camera. Consequently, the possibility that an imbalance between traffic on the first path and traffic on the second path may occur can be reduced.

According to the present disclosure, it is possible to more appropriately transmit image data output from the image capturing units connected in a daisy chain connection.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, some or all of the functional configurations of the image capturing system described above may be implemented as hardware on the control apparatus 400. While exemplary embodiments have been described in detail above, for example, the above-described exemplary embodiments may be arbitrarily combined.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-039845, filed Mar. 5, 2019, which is hereby incorporated by reference herein in its entirety.

What is claimed is:

1. An information processing apparatus comprising:
   one or more processors functioning by executing instructions stored in one or more memories as the following units:
   an acquisition unit configured to acquire state information indicating a state of each of a plurality of image capturing units connected in a daisy chain connection, the image capturing unit being configured to transmit image data to an image generation apparatus, which generates a virtual viewpoint image by using the image data, via another image capturing unit connected in the daisy chain connection; and
   a change unit configured to change a transmission path of the image data transmitted by at least one image capturing unit included in the plurality of image capturing units based on the state information acquired by the acquisition unit.

2. The information processing apparatus according to claim 1, wherein, in a case where the state information indicates that an image capturing unit which is unable to communicate is present, the change unit changes the transmission path of the image data transmitted by at least one image capturing unit so that the image data is transmitted without passing through the image capturing unit which is unable to communicate indicated by the state information.

3. The information processing apparatus according to claim 2, wherein the image capturing unit which is unable to communicate indicated by the state information is unable to communicate with the information processing apparatus.

4. The information processing apparatus according to claim 1, wherein the state information includes information indicating whether the image capturing unit is in a communication possible state.

5. The information processing apparatus according to claim 1, wherein the state information includes information based on a usage amount of communication band for an image capturing unit included in the plurality of image capturing units.

6. The information processing apparatus according to claim 5,
wherein the state information is information based on the usage amount of communication band for each of two specific image capturing units among the plurality of image capturing units, and
wherein, in a case where two usage amounts of communication band for each of the two specific image capturing units based on the state information satisfy a predetermined condition, the change unit changes the transmission path of the image data transmitted by each of at least one image capturing unit via the image capturing unit corresponding to the larger one of the two usage amounts so that the image data is transmitted without passing through the image capturing unit corresponding to the larger one of the two usage amounts.

7. The information processing apparatus according to claim 6, wherein the two specific image capturing units are image capturing units to be connected to the image generation apparatus without passing through any other image capturing units.

8. The information processing apparatus according to claim 6, wherein the at least one image capturing unit is an image capturing unit selected in a descending order of the number of image capturing units through which the image data to be transmitted to the image generation apparatus passes among all image capturing units that transmit the image data via an image capturing unit that is included in the plurality of image capturing units and corresponds to the larger one of the usage amounts.

9. The information processing apparatus according to claim 6, wherein the state information is information based on the usage amount of communication band for each of the two image capturing units used for transmitting the image data that has already been transmitted to the image generation apparatus.

10. The information processing apparatus according to claim 6,
wherein the acquisition unit acquires, from each of the plurality of image capturing units, the usage amount of communication band for transmitting image data that has not been transmitted yet and is used to generate the image, and acquires the state information based on the acquired usage amount of communication band for each of the plurality of image capturing units, and
wherein the change unit changes the transmission path of the image data transmitted by each of at least one image capturing unit via the image capturing unit corresponding to the larger one of the usage amounts so that the image data used to generate the image is transmitted without passing through the image capturing unit corresponding to the larger one of the usage amounts.

11. The information processing apparatus according to claim 6, wherein the condition is one of a condition that a size of a difference between the two usage amounts is more than or equal to a predetermined threshold, and a condition that a ratio of the larger one of the two usage amounts to the smaller one of the two usage amounts is more than or equal to a predetermined threshold.

12. The information processing apparatus according to claim 1, wherein the state information includes information based on at least one of a type of a lens to be mounted on each of the image capturing units and a focal length of each of the image capturing units.

13. The information processing apparatus according to claim 1, wherein the state information includes information based on a data amount of the image data transmitted by at least one image capturing unit included in the plurality of image capturing units.

14. An information processing method to be executed by an information processing apparatus, the information processing method comprising:
acquiring state information indicating a state of each of a plurality of image capturing units connected in a daisy chain connection, the image capturing unit being configured to transmit image data to an image generation apparatus, which generates a virtual viewpoint image by using the image data, via another image capturing unit connected in the daisy chain connection; and
changing a transmission path of the image data transmitted by at least one image capturing unit included in the plurality of image capturing units based on the acquired state information.

15. A non-transitory computer-readable storage medium storing a program for causing a computer to execute a method, the method comprising:
acquiring state information indicating a state of each of a plurality of image capturing units connected in a daisy chain connection, the image capturing unit being configured to transmit image data to an image generation apparatus, which generates a virtual viewpoint image by using the image data, via another image capturing unit connected in the daisy chain connection; and
changing a transmission path of the image data transmitted by at least one image capturing unit included in the plurality of image capturing units based on the acquired state information.

* * * * *